United States Patent
Oh et al.

(10) Patent No.: US 12,242,767 B2
(45) Date of Patent: Mar. 4, 2025

(54) DISPLAY APPARATUS AND CONTROL METHOD THEREOF

(71) Applicant: SAMSUNG ELECTRONICS CO., LTD., Suwon-si (KR)

(72) Inventors: Sanghoon Oh, Suwon-si (KR); Youngjo Seo, Suwon-si (KR); Youngkook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 156 days.

(21) Appl. No.: 18/085,755

(22) Filed: Dec. 21, 2022

(65) Prior Publication Data

US 2023/0141114 A1    May 11, 2023

Related U.S. Application Data

(63) Continuation of application No. PCT/KR2022/013178, filed on Sep. 2, 2022.

(30) Foreign Application Priority Data

Nov. 11, 2021  (KR) ........................ 10-2021-0155109

(51) Int. Cl.
*G06F 3/14* (2006.01)
(52) U.S. Cl.
CPC .................................. *G06F 3/1446* (2013.01)
(58) Field of Classification Search
CPC .................................................... G06F 3/1446
See application file for complete search history.

(56) References Cited

U.S. PATENT DOCUMENTS

| 8,736,755 B2 | 5/2014 | Yang |
| 10,068,555 B2 | 9/2018 | Kim et al. |

(Continued)

FOREIGN PATENT DOCUMENTS

| CN | 111933038 A | 11/2020 |
| CN | 113066451 A | 7/2021 |

(Continued)

OTHER PUBLICATIONS

International Search Report (PCT/ISA/210) and Written Opinion (PCT/ISA/237) dated Dec. 22, 2022 issued by the International Searching Authority in International Application No. PCT/KR2022/013178.

(Continued)

*Primary Examiner* — Shivang I Patel
(74) *Attorney, Agent, or Firm* — Sughrue Mion, PLLC (57) ABSTRACT

A display apparatus is provided. The display apparatus includes: a display with a first display module and a second display module; a timing controller; a communication interface; and one or more processor configured to, based on content received from a plurality of source devices through the communication interface in a multi-view mode, control the display to display the received content through different regions on the display, identify a first frame rate of first content received from a first source device and a second frame rate of second content received from a second source device, control the timing controller to control the first display module to operate at the first frame rate, and control the timing controller to control the second display module to operate at the second frame rate.

20 Claims, 8 Drawing Sheets

(56) References Cited

U.S. PATENT DOCUMENTS

| | | |
|---|---|---|
| 10,096,303 B2 | 10/2018 | Lee et al. |
| 10,192,506 B2 | 1/2019 | Wu et al. |
| 11,657,748 B2 | 5/2023 | Lu |
| 2009/0315876 A1 | 12/2009 | Ichikawa et al. |
| 2015/0253937 A1 | 9/2015 | Kim et al. |
| 2016/0098963 A1 | 4/2016 | Kim et al. |
| 2016/0180762 A1 | 6/2016 | Bathiche et al. |
| 2018/0152664 A1* | 5/2018 | Urabe .................. H04N 7/0127 |
| 2018/0268769 A1 | 9/2018 | Wu et al. |
| 2020/0014904 A1* | 1/2020 | Wetzstein .............. H04N 13/15 |
| 2021/0343228 A1 | 11/2021 | Lee |
| 2022/0309977 A1 | 9/2022 | Lu |
| 2023/0317014 A1* | 10/2023 | Hong .................. G09G 3/3258 |

FOREIGN PATENT DOCUMENTS

| | | | |
|---|---|---|---|
| JP | 2007-322747 A | 12/2007 | |
| JP | 2009-198952 A | 9/2009 | |
| JP | 6673319 B2 | 3/2020 | |
| KR | 10-1197149 B1 | 11/2012 | |
| KR | 10-1311668 B1 | 9/2013 | |
| KR | 10-2014-0137949 A | 12/2014 | |
| KR | 10-2015-0042102 A | 4/2015 | |
| KR | 10-2016-0024278 A | 3/2016 | |
| KR | 10-1560410 B1 | 10/2016 | |
| KR | 10-2017-0087269 A | 7/2017 | |
| KR | 10-2261961 B1 | 6/2021 | |
| KR | 10-2266045 B1 | 6/2021 | |
| KR | 10-2021-0133794 A | 11/2021 | |

OTHER PUBLICATIONS

Communication dated Nov. 14, 2024, issued by the European Patent Office in European Application No. 22892994.9.

* cited by examiner

//DISPLAY APPARATUS AND CONTROL METHOD THEREOF

CROSS-REFERENCE TO RELATED APPLICATION(S)

This application is a bypass continuation of International Application No. PCT/KR2022/013178, filed on Sep. 2, 2022, which is based on and claims priority to Korean Patent Application No. 10-2021-0155109, filed on Nov. 11, 2021, in the Korean Intellectual Property Office, the disclosures of which are incorporated by reference herein in their entireties.

BACKGROUND

1. Field

This disclosure relates to a display apparatus and a control method thereof and, more particularly, to a display apparatus configured to operate in a multi-view mode and a control method thereof.

2. Description of Related Art

With the development of electronic technology, various types of electronic devices are being developed and disseminated. Many advances have been made with respect to mobile devices and display apparatuses, such as televisions (TVs), in recent years.

A display apparatus may have a high resolution and large scale, and may therefore output multiple contents simultaneously.

Each of the plurality of contents that the display apparatus outputs at the same time may have a different frame rate, which case the display apparatus outputs the plurality of contents at a common frame rate and does not maintain the frame rate of each of the plurality of contents.

By outputting each of the plurality of contents at the common frame rate, rather than maintaining the different frame rates of the plurality of contents, motion of an object included in content of 120 Hz content and 60 Hz content and a motion of a character according to manipulation of a user of a game content may not be properly expressed.

There is a need for an apparatus and a method for maintaining and outputting a frame rate of each of a plurality of contents.

SUMMARY

Provided is a display apparatus for maintaining and outputting a frame rate of each of a plurality of contents and a control method thereof.

According to an aspect of the disclosure, a display includes a display comprising a plurality of display modules; a timing controller (T-CON) corresponding to each of the plurality of display modules; a communication interface comprising a circuitry; and one or more processor configured to, based on receiving content from each of a plurality of source devices through the communication interface in a multi-view mode, control the display to display the received content through different regions on the display, the one or more processor may identify a frame rate of the first content displayed in the first region among the different regions, and control a T-CON corresponding to the at least one display module among the plurality of T-CONs so that at least one display module included in the first area among the plurality of display modules operates at the identified frame rate.

According to an embodiment, a method of controlling a display apparatus comprising a display comprising a plurality of display modules and a timing controller (T-CON) corresponding to each of the plurality of display modules, the method comprising receiving content from each of a plurality of source devices in a multi-view mode; and displaying the received content through different regions on the display, the displaying the received content may include identifying a frame rate of the first content displayed in a first region among the different regions; and controlling a T-CON corresponding to the at least one display module among the plurality of T-CONs so that at least one display module included in the first area among the plurality of display modules operates at the identified frame rate.

According to an aspect of the disclosure, a non-transitory computer readable recording medium including a program executes a controlling method of a display apparatus comprising a display comprising a plurality of display modules and a timing controller (T-CON) corresponding to each of the plurality of display modules, the method comprising receiving content from each of a plurality of source devices in a multi-view mode; and displaying the received content through different regions on the display, the displaying the received content may include identifying a frame rate of the first content displayed in a first region among the different regions; and controlling a T-CON corresponding to the at least one display module among the plurality of T-CONs so that at least one display module included in the first area among the plurality of display modules operates at the identified frame rate.

According to various embodiments, when a plurality of contents have different frame rates, a frame rate of each of the plurality of contents may be maintained.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, embodiments will be described in greater detail with reference to the drawings.

The terms used in the disclosure and the claims are general terms identified in consideration of the functions of embodiments. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

In this disclosure, the expressions "have," "may have," "include," or "may include" or the like represent presence of a corresponding feature (for example: components such as numbers, functions, operations, or parts) and does not exclude the presence of additional feature.

Expressions such as "at least one of," and "at least one from among," when preceding a list of elements, modify the entire list of elements and do not modify the individual elements of the list. For example, the expression, "at least one from among a, b, and c," should be understood as including only a, only b, only c, both a and b, both a and c, both b and c, or all of a, b, and c.

In the disclosure, the terms "1st" or "first" and "2nd" or "second" may use corresponding components regardless of importance or order and are used to distinguish one component from another without limiting the components.

In addition, the description in the disclosure that one element (e.g., a first element) is "(operatively or communicatively) coupled with/to" or "connected to" another element (e.g., a second element) should be interpreted to include both the case that the one element is directly coupled to the another element, and the case that the one element is coupled to the another element through still another intervening element (e.g., a third element).

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part," and so on may be used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

In this disclosure, the term user may refer to a person using an electronic apparatus or an apparatus (for example: artificial intelligence (AI) electronic apparatus) that uses an electronic apparatus.

Hereinafter, various example embodiments will be described in greater detail with reference to the accompanying drawings.

Figure 1:
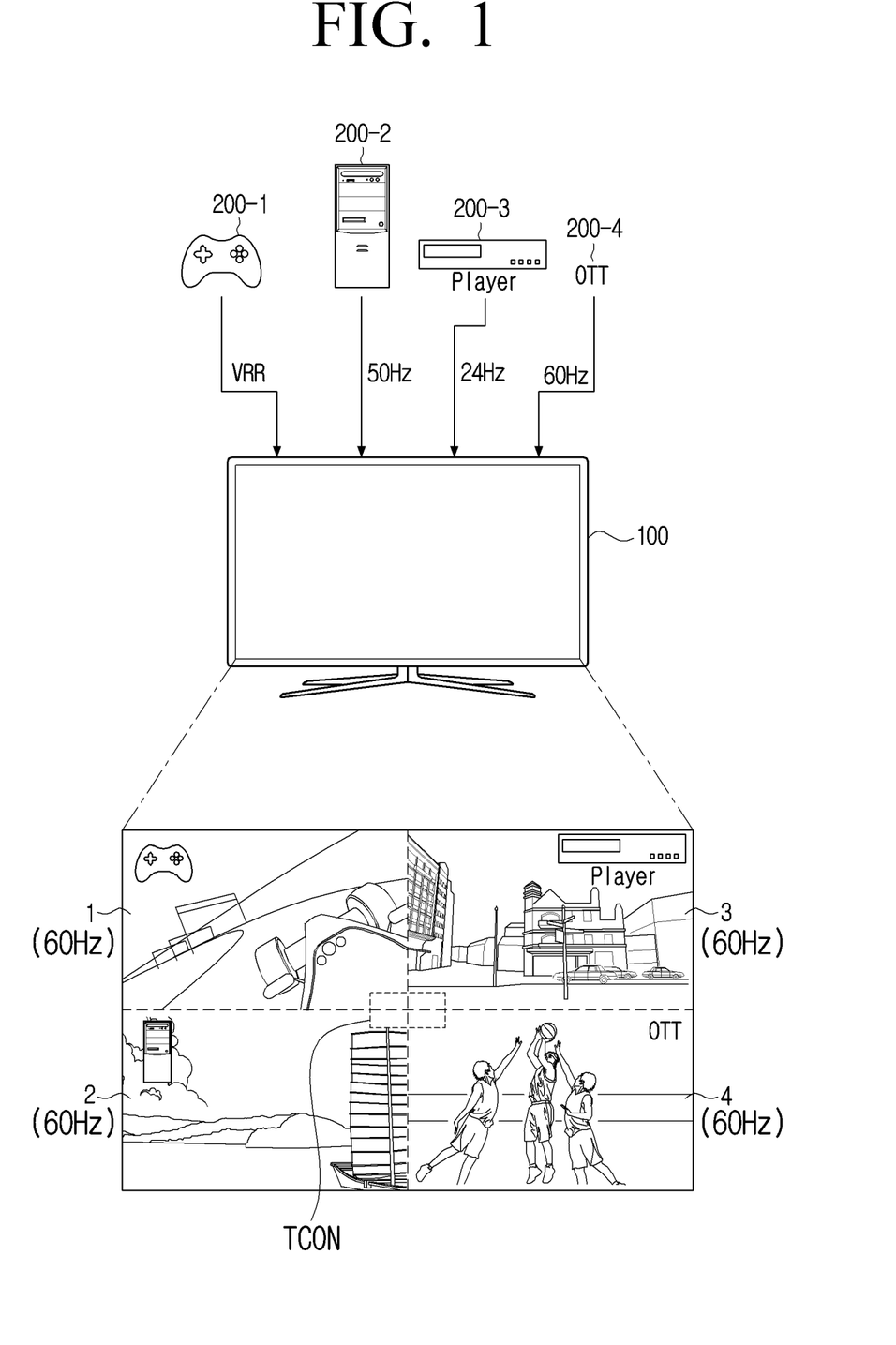
FIG. 1 is a diagram illustrating a multi-view mode according to an embodiment.

FIG. 1 is a diagram illustrating a multi-view mode according to an embodiment.

As illustrated in FIG. 1, the display apparatus 100 may be implemented as a television (TV), but is not limited thereto, and may be applicable to any device having a display function such as a video wall, a large format display (LFD), a digital signage, and a digital information display (DID), a projector display, or the like. In addition, the display apparatus 100 may be implemented as various types displays, such as a liquid crystal display (LCD), an organic light-emitting diode (OLED), a liquid crystal on silicon (LCoS), a digital light processing (DLP), a quantum dot (QD) display panel, a quantum dot light-emitting diodes (QLED), micro light-emitting diodes (µLED), mini LED, or the like. The display apparatus 100 may be implemented as a touch screen coupled with a touch sensor, a flexible display, a rollable display, a three-dimensional (3D) display, a display in which a plurality of display modules are physically connected, or the like.

The display apparatus 100 may receive content from each of a plurality of source devices, and as illustrated in FIG. 1, may display a plurality of contents at the same time.

For example, the display apparatus 100 may provide a picture in picture (PIP) mode, a picture by picture (PBP) mode, or the like. For example, according to the PIP mode, the display apparatus 100 may display first content 1 received from a first source device 200-1 on a full screen, and overlay second content 2 received from a second source device 200-2 on one region within the full screen on which the first content 1 is displayed. Here, the position and size of the one region may be fixed, or the position and size of the one region may be adjusted according to a user command or the like.

As another example, according to the PBP mode, the display apparatus 100 may display the first content 1 received from the first source device 200-1 in one region within the full screen and display the second content 2 received from the second source device 200-2 in a remaining region within the full screen. Here, the position and size of the one region and the remaining region may be fixed, or may be adjusted according to a user command, content, or the like.

Hereinafter, a mode in which the display apparatus 100 displays a plurality of contents in a full screen such as the PIP mode and PBP mode will be referred to as a multi-view mode.

Referring to FIG. 1, for convenience of description, the display apparatus 100 may divide a full screen into four different regions in which four display contents are displayed, but this is provided as an example, and embodiments are not limited thereto.

For example, the display apparatus 100 may divide a full screen in two and may display content on each of two different regions.

The size (or ratio) of the different regions may be the same or different.

Referring to FIG. 1, the display apparatus 100 may receive content from each of the plurality of source devices 200. For example, when the display apparatus 100 performs communication with n (n is a natural number) source devices 200 to receive content, the display apparatus 100 may obtain and output frames including each of the content in each of the n different regions on the screen by dividing the full screen by n.

For example, the display apparatus 100 may position first content 1 received from a first source device 200-1 in a first region, position second content 2 received from a second source device 200-2 in a second region, position third content 3 received from a third source device 200-3 in the third region, and position fourth content 4 received from a fourth source device 200-4 in a fourth region to provide a frame in which each of the content received from the first to fourth source devices 200-1, . . . , 200-4 is included.

For convenience, the number of source devices 200 providing the contents and the number of different regions provided with the contents within the full screen are unified, but this is provided as an example, and embodiments are not limited thereto. For example, the display apparatus 100 may receive content from each of the four source devices 200 and divide the full screen into two to display the first content 1 and the second content 2 in each of the two different regions. As another example, the display apparatus 100 may display the first content 1 and the fourth content 4 in each of the two different regions based on a user command or the like.

The plurality of source devices providing content to the display apparatus 100 each may have the same or different specification, format of provided content, size, resolution, contrast (e.g., high dynamic range (HDR) or standard dynamic range (SDR)), frame rate of content, or the like.

For example, the frame rate of the first content 1 received from the first source device 200-1 may be 60 Hz, and the frame rate of the second content 2 received from the second source device 200-2 may be 50 Hz. According to an embodiment, when the display apparatus 100 operates at one frame rate (e.g., 60 Hz), the display apparatus 100 may output each of the first content 1 and the second content 2 at 60 Hz. Accordingly, the frame rate of the second content 2 is 50 Hz, but the display apparatus 100 outputs the second content 2 at a frame rate of 60 Hz.

In a related multi-view mode for simultaneously providing a plurality of contents, a display apparatus changes a frame rate of each of a plurality of contents to a frame rate of the display apparatus, and then outputs a plurality of contents at the frame rate of the display apparatus, which causes several limitations in that the display apparatus fixes the content supporting variable refresh rate (VRR) to the frame rate of the display apparatus for outputting the content, and outputs a plurality of contents at a frame rate (e.g., frame rate of 60 Hz, if the maximum frame rate of the display apparatus is 120 Hz) lower than a maximum frame rate of the display apparatus.

For example, if the display apparatus operates at a maximum frame rate, the display apparatus may output a plurality of content after generating an interpolation frame using a motion estimation, motion compensation (ME/MC) such that each frame rate of the plurality of content corresponds to a maximum frame rate. In this case, the interpolation frame generated using ME/MC may generate an artifact, a distortion, an unnatural motion of an object in the content, and the like.

To address these issues, the display apparatus 100 according to an embodiment may concurrently provide each of a plurality of contents in a multi-view mode at different frame rates (e.g., frame rates of each of the plurality of contents).

FIG. 1 illustrates a case where each of a plurality of source devices 200 is identical or similar to each other for convenience of description, but this is provided as an example, and embodiments are not limited thereto. The source device 200 may be implemented with various kinds of electronic devices. For example, each of the plurality of source devices 200 may be implemented as various types of electronic devices that provide content such as Blu-Ray player, digital versatile disc (DVD) player, streaming content output device, set-top box, cloud server, over-the-top (OTT) media service server, personal computer (PC), video game console, etc. The display apparatus 100 may perform image processing according to various embodiments with respect to an image and output the image by itself, or may provide the image to another electronic device having a display.

Figure 2:
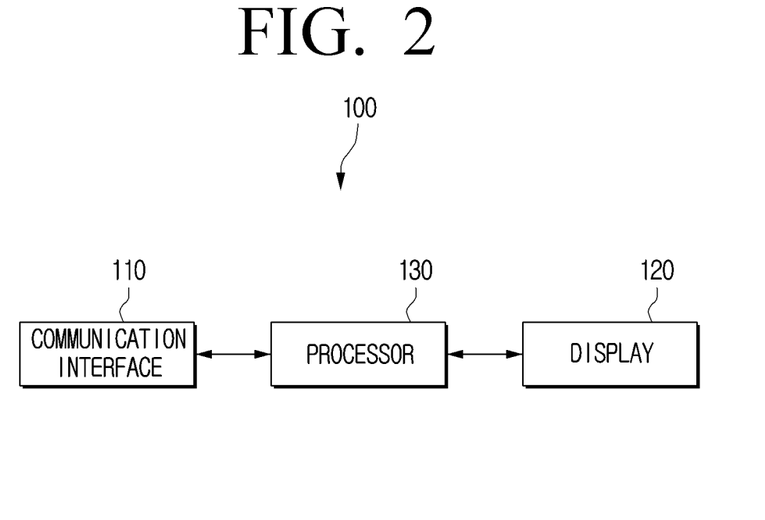
FIG. 2 is a block diagram illustrating a configuration of a display apparatus according to an embodiment.

FIG. 2 is a block diagram illustrating a configuration of a display apparatus according to an embodiment.

Referring to FIG. 2, the display apparatus 100 includes a communication interface 110, a display 120, and one or more processor 130.

The communication interface 110 may receive various data. For example, the communication interface 110 may receive various data, for example, content from at least one source device 200, external storage medium (e.g., USB memory), an external server (e.g., webhard) through a communication method such as AP-based wireless fidelity (WI-FI, wireless LAN network), a Bluetooth (BT), ZigBee, wired/wireless local area network (LAN), wide area network (WAN), IEEE 1394, high definition multimedia interface (HDMI), universal serial bus (USB), mobile high-definition link (MHL), advanced encryption standard (AES)/European broadcasting union (EBU), optical, and coaxial.

The communication interface 110 according to an embodiment may receive content by performing wired or wireless communication with each of the plurality of source devices 200.

The display 120 may be implemented as a display including a self-emitting element or a display including a non-self-limiting element and a backlight. For example, the display 120 may be implemented as a display of various types such as, for example, and without limitation, a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or the like. In the display 120, a backlight unit, a driving circuit which may be implemented as an A-Si TFT, low temperature poly silicon (LTPS) TFT, organic TFT (OTFT), or the like, may be included as well. The display 120 may be implemented as a touch screen coupled to a touch sensor, a flexible display, a rollable display, a third-dimensional (3D) display, a display in which a plurality of display modules are physically connected, or the like.

The one or more processor 130 according to an embodiment control overall operations of the display apparatus 100.

The one or more processor 130 according to an embodiment may be implemented with, for example, and without limitation, a digital signal processor (DSP) for image-processing of a digital image signal, a microprocessor, a graphics processor (GPU), an artificial intelligence (AI) processor, a neural processor (NPU), a timing controller (T-CON), or the like, but the one or more processor are not limited thereto. The one or more processor 110 may include, for example, and without limitation, one or more among a central processor (CPU), a micro controller unit (MCU), a microprocessor (MPU), a controller, an application processor (AP), a communication processor (CP), an advanced reduced instruction set computing (RISC) machine (ARM) processor, a dedicated processor, or may be defined as a corresponding term. The one or more processor 130 may be implemented in a system on chip (SoC) type or a large scale integration (LSI) type which a processing algorithm is built therein, application specific integrated circuit (ASIC), or in a field programmable gate array (FPGA) type. The one or more processor 130 may perform various functions by executing computer executable instructions stored in a memory.

The one or more processor, when content is received from each of the plurality of source devices 200 through the communication interface in a multi-view mode, may obtain a frame including each of the content received at different regions.

Figure 3:
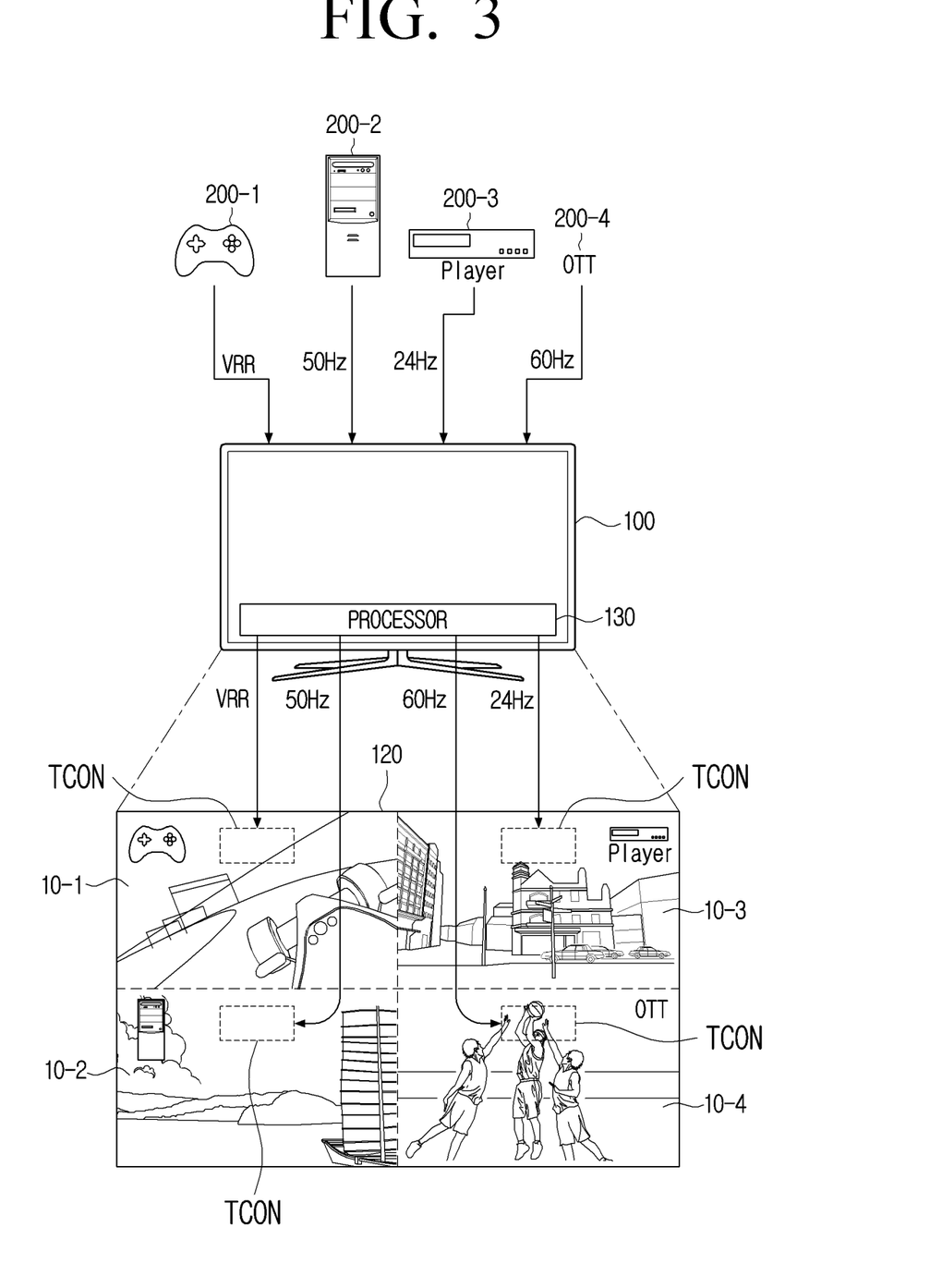
FIG. 3 is a diagram illustrating a frame rate of each content according to an embodiment.

A specific description will refer to FIG. 3.

FIG. 3 is a diagram illustrating a frame rate of each content according to an embodiment.

The display 120 according to an embodiment may be implemented to include a plurality of display modules 10-1 . . . 10-*n*.

For example, as illustrated in FIG. 3, a plurality of display modules 10-1, . . . , 10-*n* may be coupled to implement one display apparatus (that is, display system).

Each of the plurality of display modules 10-1 and 10-*n* may include a plurality of self-emissive elements. Here, the self-emissive elements may be at least one of a light emitting diode (LED) or a micro LED.

In addition, each of the plurality of display modules 10-1, . . . 10-*n* may be implemented as an LED cabinet including a plurality of light emitting diode (LED) elements. Each LED element may be implemented as an RGB LED, and the RGB LED may include a red LED, a green LED, and a blue LED. The LED elements may additionally include a white LED other than the RGB LED.

According to an example, the LED element may be implemented as a micro LED. The micro LED is an LED of a size of about 5-100 micrometers, and is a micro light-emitting element. The micro LED may emit light of a corresponding color (i.e., red, green, blue and white), and therefore may not require a color filter.

Each of the plurality of display modules 10-1, . . . , and 10-*n* may include a timing controller (T-CON). The T-CON may include circuitry for adjusting the amount of data delivered/transmitted to a display driver integrated circuit (IC) (DDI). For example, the T-CON may convert the data signal received from the one or more processor 130 into a signal required by a gate IC and source IC of the DDI, and the DDI may drive each of the plurality of pixels included in the display module 10.

According to an embodiment, the one or more processor 130 may provide each of the contents received from a plurality of source devices 200 through different regions on the display 120.

For example, the one or more processor 130 may display the first content 1 received from the first source device 200-1 in the first region. The first region may include the first display module 10-1. In this case, the one or more processor 130 may provide a data signal corresponding to the first content 1 to the T-CON corresponding to the first display module 10-1.

As shown in FIG. 3, the one or more processor 130 may provide a data signal corresponding to the second content 2 to the T-CON corresponding to the second display module 10-2 included in the second region 20 to display the second content 2 received from the second source device 200-2 in the second region.

As illustrated in FIG. 3, the contents received from each of the plurality of source devices 200 may have different frame rates.

As illustrated above, the one or more processor 130 may adjust the frame rate of the display module 10 in order to maintain the frame rate of the content when outputting the content.

The frame rate of the display module may be referred to as a refresh rate, a frequency, or a scanning rate, but will hereinafter be referred to as a frame rate for convenience of description. The frame rate of the display module 10 may be expressed in a unit of Hz. For example, if the frame rate of the display module 10 is 60 Hz, the display module 10 may provide 60 frames per second. As another example, if the frame rate of the display module 10 is 120 Hz, the display module 10 may provide 120 frames per second. The example that the frame rate of the display module 10 is driven to 60 Hz and 120 Hz is provided as an example, and embodiments are not limited thereto. For example, the display module 10 may be driven at various frame rates such as 75 Hz, 120 Hz, 144 Hz, 240 Hz, etc.

Referring to FIG. 3, when content is received from each of the plurality of source devices 200 through the communication interface 110 in the multi-view mode, the one or more processor 130 may display the received content through different regions on the display 120.

The one or more processor 130 according to an embodiment may identify the frame rate of the first content 1 displayed on the first region among different regions.

As an example, the image content (e.g., video) may refer to a set of temporally continuous still images, and one still image may be a frame. The frame rate of the image may be expressed in a unit of frames per second (FPS). The frame rate of the content may indicate the number of frames constituting the image for one second. The frame rate of an image may be referred to as a frame speed, a frame rate, but will hereinafter be referred to as a frame rate for convenience of description.

For example, if a content of at least 24 FPS is provided, the user may determine the corresponding content as a soft and smooth image. Generally, as the frame rate of the content increases, a user may feel that a soft and smooth image is provided, but embodiments are not limited thereto.

The display apparatus 100 according to various embodiments may receive and display content of various frame rates such as 60 FPS, 120 FPS, 1000 FPS, and the like, such as a game (e.g., first-person shooter game, racing game) content, sports content, and slow motion content, or the like.

The one or more processor 130 according to an embodiment may identify a frame rate of the first content 1 when the first content 1 is received from the first source device 200-1 through the communication interface 110. As an example, a frame rate of an image (e.g., FPS of an image) may be identified based on metadata of the received content. The configuration that the one or more processor 130 identify the frame rate of the image based on the metadata of the content is provided as an example, and embodiments are not limited thereto. For example, the one or more processor 130 may identify the frame rate of the corresponding content based on the number of frames constituting the content for one second among the plurality of frames constituting the content.

The one or more processor 130 may then control the T-CON corresponding to the first display module 10-1 such that the first display module 10-1 included in the first region in which the first content 1 is displayed operates at the identified frame rate, i.e., the frame rate of the first content 1.

As an example, if the frame rate of the first content is a variable frame rate (VRR), the one or more processor 130 may control the T-CON of the first display module 10-1 such that the frame rate of the first display module 10-1 is variably changed in accordance with the frame rate of the first content. As another example, if the frame rate of the first content is 60 FPS, the one or more processor 130 may control the T-CON of the first display module 10-1 such that the first display module 10-1 included in the first region displaying the first content operates at a frame rate of 60 Hz corresponding to 60 FPS.

The frame rate (e.g., FPS unit) of content may indicate the number of frames constituting an image during one second, and the frame rate (e.g., Hz unit) of the display module 10 may indicate the number of frames provided by the display module 10 for one second.

As an example, if the frame rate of the content is low compared to the frame rate of the display module 10, the display module 10 may repeatedly display some of the frames that make up the content, which may cause an image to appear to be slow to a user.

As another example, if the frame rate of the content is higher than the frame rate of the display module 10, several new frames may be created before the display module 10 displays a next frame, which may cause some frames constituting the content to be lost or not be displayed For convenience of description, only embodiments in which the frame rate of the first display module 10-1 is changed based on the first content 1 received from the first source device 200-1 have been described, but the embodiments are not limited thereto, and the one or more processor 130 may identify the frame rate of the contents received from each of the plurality of source devices 200, and may control the corresponding T-CONs of the display modules 10 to operate at the identified frame rates corresponding to the different regions in which each of the plurality of content is displayed.

For convenience of description, FIG. 3 has been described under the assumption that the first to fourth display modules 10-1, . . . , 10-4 constitute the display apparatus 100, and that each of the four different contents is displayed in the first to fourth display modules 10-1, . . . , 10-4, but this is provided as an example and embodiments are not limited thereto. Hereinafter, various configurations of the display apparatus 100 will be described.

Figure 4:
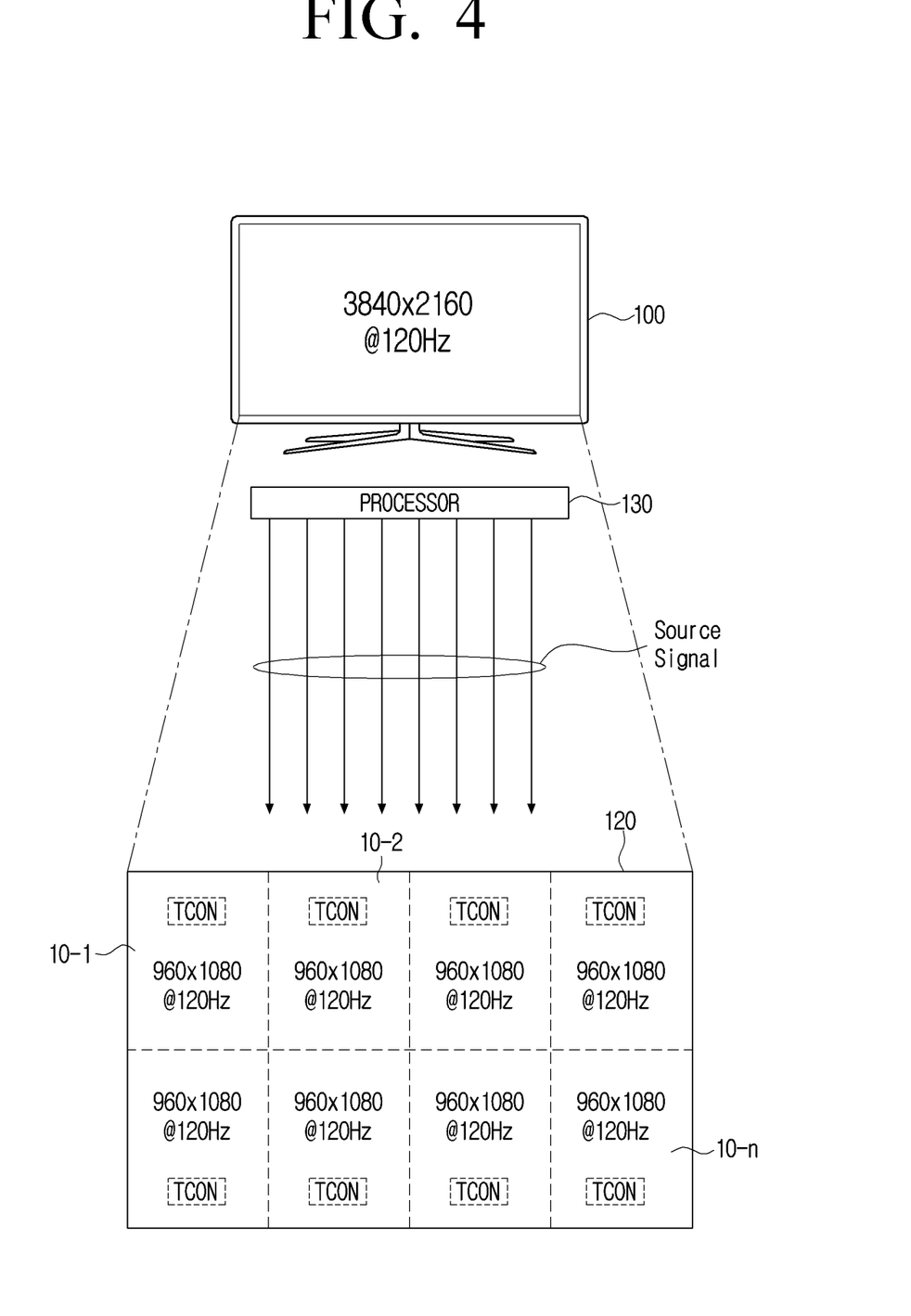
FIG. 4 is a diagram illustrating a display module and a timing controller (T-CON) according to an embodiment.

FIG. 4 is a diagram illustrating a display module and a timing controller (T-CON) according to an embodiment.

FIG. 4 is a diagram illustrating a case in which the display apparatus 100 is composed of a total of eight display modules 10 and eight T-CONs, and each of the plurality of display modules 10-1, . . . , 10-n is implemented at a resolution of 960×1080. The T-CON of each of the plurality of display modules 10-1, . . . , 10-n may receive control signals, data signals, etc., from the one or more processor 130. In this case, the display apparatus 100 may have a resolution of 3840×2160. This is provided as an example, and according to embodiments, the number of display modules 10 included by the display apparatus 100 may be variously changed, and resolution of the display apparatus 100 may also be variously changed as the resolution of each of the plurality of display modules 10-1, . . . , 10-n is variously changed.

According to one embodiment, processor 130 may transmit control signals, data signals, etc., corresponding to content received from the source device to a plurality of T-CONs each. Each of the plurality of T-CONs may then be controlled by the corresponding display module 10 to display all or part of the content at a frame rate of the content based on the signal received from the one or more processor 130. The specific numbers in the above-described embodiment are provided as an example, and embodiments are not limited thereto.

Referring to FIG. 4, for convenience of description, the display module 10 is described as being driven at a frame rate of up to 120 Hz, but this is only an example and embodiments are not limited thereto. For example, the maximum frame rate of the display module 10 may vary from 144 Hz to 240 Hz, and the like.

Figure 5:
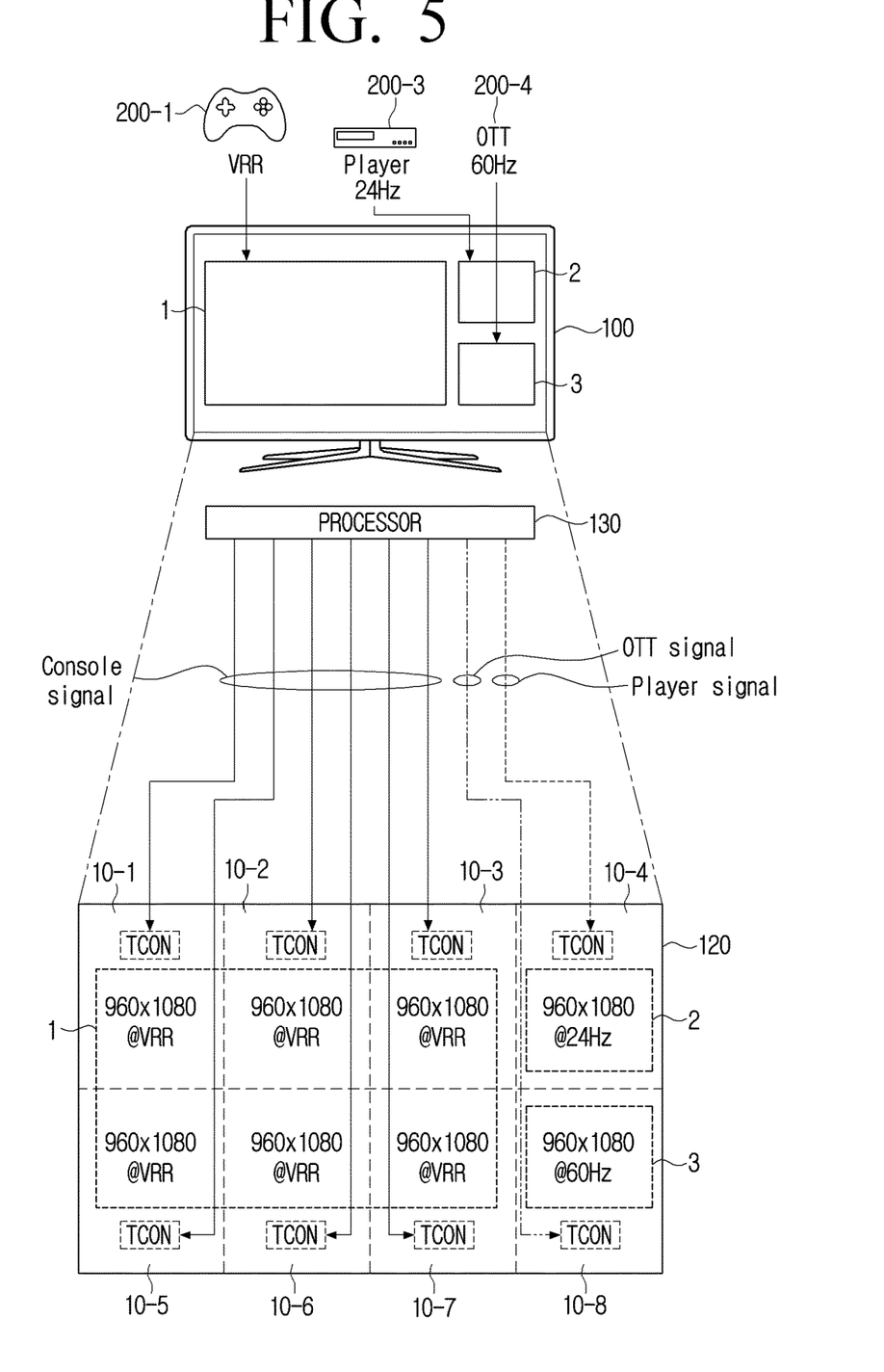
FIG. 5 is a diagram illustrating content displayed on one region according to an embodiment.

FIG. 5 is a diagram illustrating content displayed on one region according to an embodiment.

Referring to FIG. 5, the first source device 200-1 may provide the first content 1, the third source device 200-3 may provide the second content 2, and the fourth source device 200-4 may provide the third content 3.

Here, each of the first to third contents 1, 2, and 3 may have a different frame rate. For example, the frame rate of the first content 1 may be a variable frame rate (VRR), the frame rate of the second content 2 may be 24 Hz, and the frame rate of the third content 3 may be 60 Hz.

In this case, the one or more processor 130 may control the display modules included in the first region in which the first content 1 is displayed (e.g., the first display module 10-1, the second display module 10-2, the third display module 10-3, the fifth display module 10-5, the sixth display module 10-6, and the seventh display module 10-7) to operate the corresponding display modules at a variable frame rate.

Additionally, the one or more processor 130 may control the T-CON corresponding to the at least one display module (e.g., the fourth display module 10-4) included in the second region in which the second content 2 is displayed to operate the corresponding display module at 24 Hz.

Additionally, the one or more processor 130 may control the T-CON corresponding to the at least one display module (e.g., the eighth display module 10-8) included in the third region in which the third content 3 is displayed to operate the corresponding display module at 60 Hz.

As shown in FIG. 5, the unit capable of changing the frame rate may be a display module unit controlled by one T-CON. The minimum size of one region capable of displaying the content may correspond to the size of the display module 10 controlled by one T-CON.

The one or more processor 130 may control the T-CON corresponding to the at least one display module 10 included in the region in which the content is displayed to maintain the frame rate of the content at the time of outputting the content.

For example, the one or more processor 130 may change and output the frame rate of the display module 10 according to the type of the content.

For example, the one or more processor 130 may identify the type of the first content 1 displayed in the first region among the different regions on the display 120.

The one or more processor 130 may obtain a frame rate corresponding to the identified type. For example, the one or more processor 130 may identify whether the first content 1 corresponds to movie content, game content, streaming content, or image content.

The one or more processor 130 may generate an interpolation frame or the like so that image processing to increase the frame rate of content. However, such image processing may cause delay. In the case of a first-person shooter game content for which it is important to minimize delay, the one or more processor 130 may control the T-CON of the display module (e.g., the first display module 10-1, the second display module 10-2, the third display module 10-3, the fifth display module 10-5, the sixth display module 10-6, and the seventh display module 10-7) included in the first region so that the frame rate of the first content 1 is maintained (i.e., not perform the image processing to generate the interpolation frame or the like), to minimize delay when outputting the first content 1.

As another example, when the second content 2 is identified as the movie content, the one or more processor 130 may perform image processing to increase the frame rate of the content by generating the interpolation frame, or the like, and may control the T-CON of the display module (e.g., the fourth display module 10-4) included in the second region so that the second content 2 is displayed at a predetermined frame rate. For example, the one or more processor 130 may display the second content 2 having a frame rate of 24 Hz using a display module operating at 120 Hz. Here, a specific number is for convenience of description and is not limited thereto.

As another example, the one or more processor 130 may display content displayed in a particular region of the different regions at a predetermined frame rate.

For example, the one or more processor 130 may control the T-CON to operate at least one display module included in the second region of the different regions at a preset frame rate, and display the second content 2 in the second region. For example, when different regions on the display 120 are classified into a center region, a left top, a left bottom, a right top, and a right side, the center region may be displayed with the main interest content (hereinafter, main content) of the user, and content which is not the main content of the user but including additional information and the like (hereinafter referred to as sub-content) may be displayed.

According to an embodiment, the one or more processor 130 may identify the frame rate of the content displayed in the center region, and may control the T-CON included in the display module corresponding to the center region such that the display module (e.g., second display module 10-2, the third display module 10-3, the sixth display module 10-6, and the second display module 10-7 of FIG. 5) to operate at the identified frame rate.

The one or more processor 130 may control the T-CON so that the display module corresponding to the upper left region (e.g., the first display module 10-1 in FIG. 5), the display module corresponding to the lower left region (e.g., the fifth display module 10-5 in FIG. 5), the display module corresponding to the upper right end region (e.g., the fourth display module 10-4 in FIG. 5) and the display module corresponding to the right bottom region (e.g., the 8th display module 10-8 in FIG. 5) may operate at a predetermined frame rate to display the sub-content at a predetermined frame rate.

The above-described embodiments are provided as examples, and embodiments are not limited thereto. For example, the one or more processor 130 may display the main content at a predetermined frame rate, and may display the sub-content by maintaining the frame rate of the sub-content.

As another example, the one or more processor 130 may identify a region having a magnitude greater than or equal to a threshold value of the different regions.

The display module included in the identified region may control the T-CON to operate at a preset frame rate. For example, a region having a largest magnitude or a magnitude greater than a threshold value on the display 120 may be displayed with the user's main interest content (i.e., main content).

The one or more processor 130 may maintain and display the frame rate of the main content. As another example, the one or more processor 130 may control the T-CON of the display module included in the region in which the main content is displayed so that the main content is displayed at a predetermined frame rate.

Figure 6:
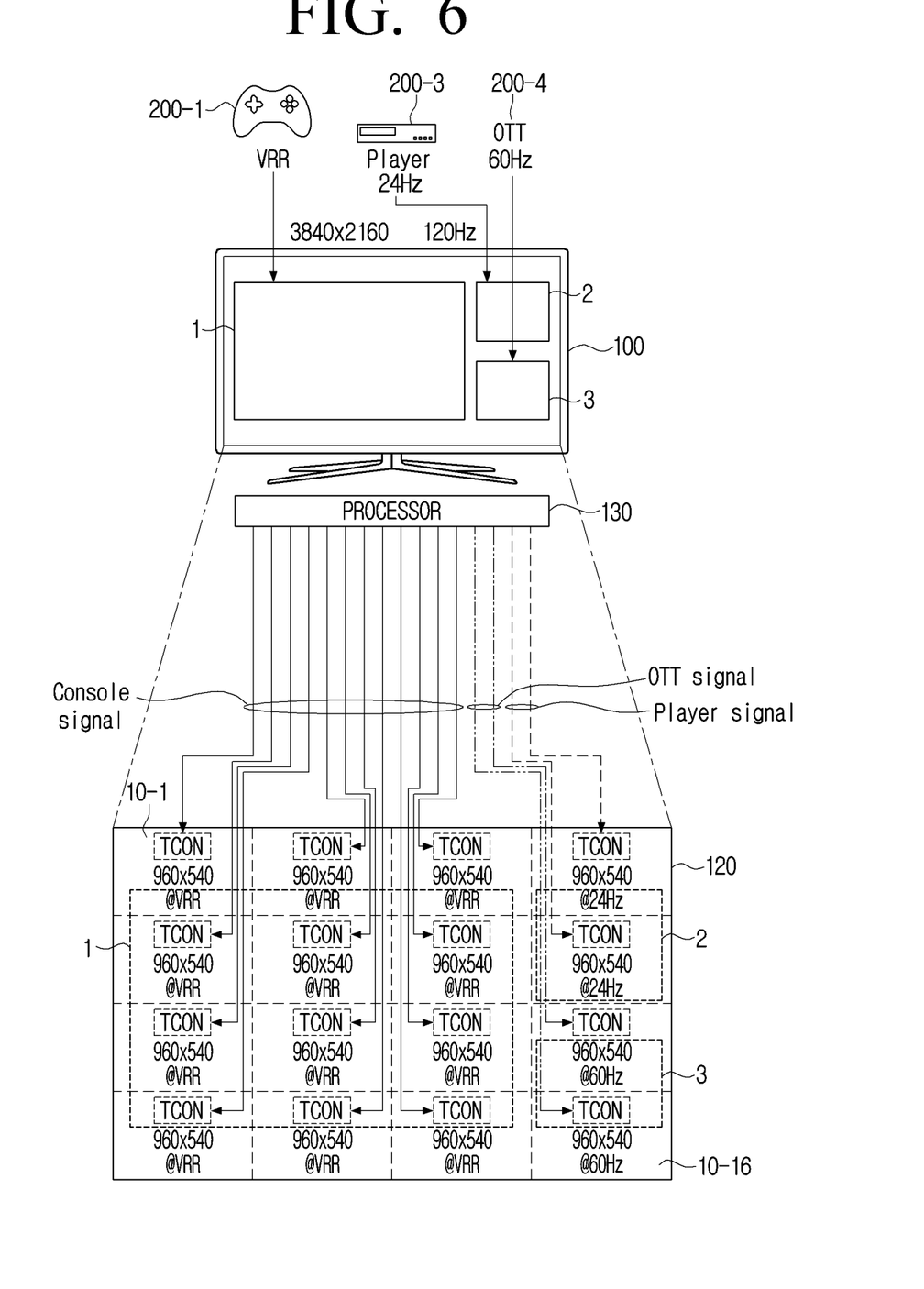
FIG. 6 is a diagram illustrating a display module and a T-CON according to another embodiment.

FIG. 6 is a diagram illustrating a display module and a T-CON according to another embodiment.

Referring to FIG. 6, the display apparatus 100 includes a plurality of display modules 10-1, ..., 10-n, and the number of the plurality of display modules 10-1, ..., 10-n may be different depending on the purpose and specification of the display apparatus 100.

The resolution, size, operable frame rate range, etc., of each of the plurality of display modules 10-1, ..., 10-n may be different depending on the display apparatus 100.

Referring to FIG. 6, the display module 10 may include a total of sixteen display modules 10-1, ..., 10-16, and each of the display modules 10 may have a resolution of 960×540 and may operate at a frame rate of up to 120 Hz. The specific numbers are provided as an example and embodiments are not limited thereto.

Referring to FIGS. 5 and 6, the number of display modules constituting a region (e.g., a first region) of the same size and resolution for each display apparatus 100 may be different according to the size, resolution, etc., of the display module 10 constituting the display apparatus 100.

In order to locate content in one region in a multi-view mode, the one or more processor 130 may locate content in one region after resizing the content on the basis of the size of one region.

In order to position the content in one region in the multi-view mode, the one or more processor 130 may upscale or downscale the content based on the resolution of one region, and then position the content in one region.

Figure 7:
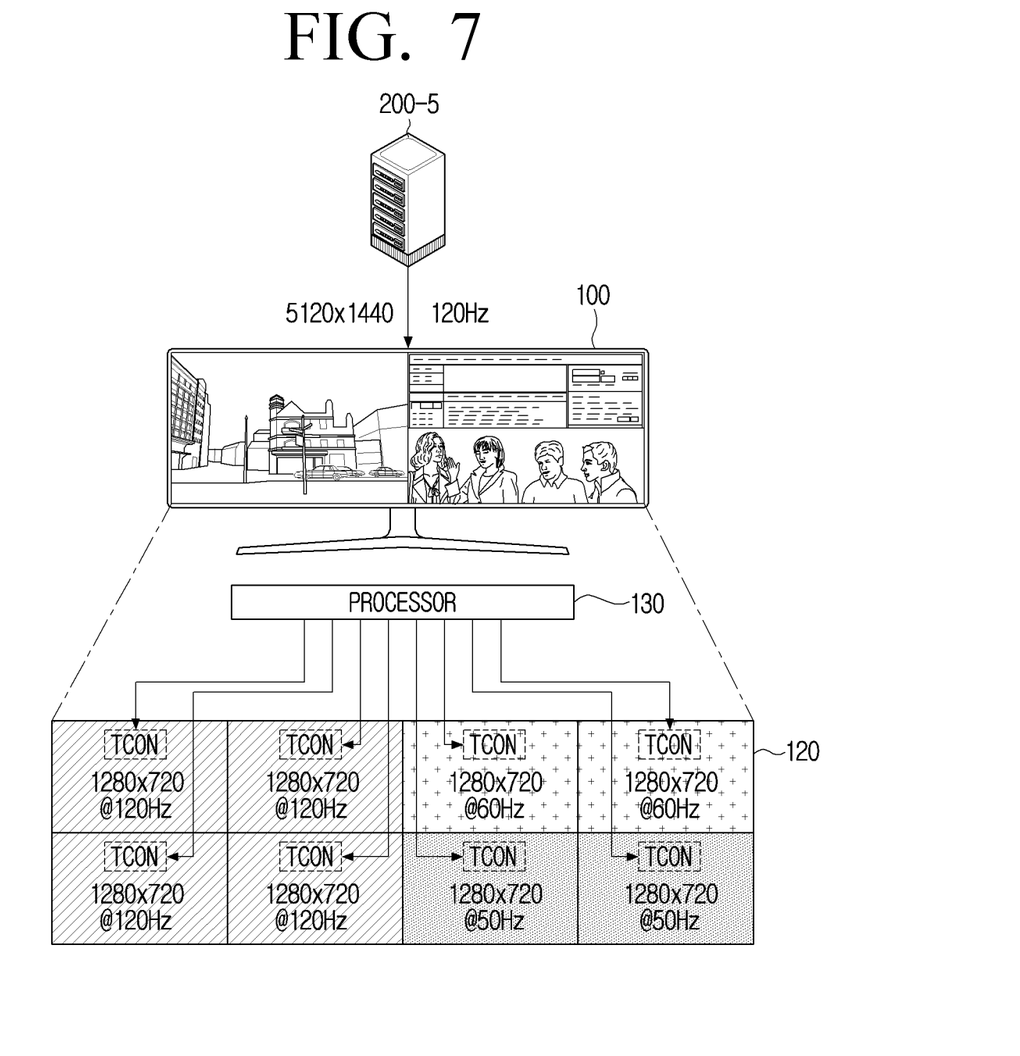
FIG. 7 is a diagram illustrating a frame rate of contents according to another embodiment.

FIG. 7 is a diagram illustrating a frame rate of contents according to another embodiment.

The one or more processor 130 may maintain and display a frame rate of content received from each of the plurality of source devices 200, and may maintain and display a frame rate of each content received from one source device 200-5.

According to another example, the one or more processor 130 may identify a type of each of a plurality of content received from one source device 200-5, and display each of the plurality of contents at different frame rates according to the identified type.

Referring to FIG. 7, when a plurality of contents are received from at least one source device 200-5 in a multi-view mode, the one or more processor 130 may identify a frame rate for each content based on the metadata of each of the plurality of contents.

The one or more processor 130 may control the T-CON of the display module 10 corresponding to the region in which each of the plurality of content is displayed according to the identified frame rate.

As another example, the one or more processor 130 may identify a type of each of the plurality of content. The one or more processor 130 may then identify a frame rate corresponding to each of the plurality of content according to the identified type. For example, the one or more processor 130 may identify a preset frame rate for each type, for example, 60 Hz for movie content, VRR for the game content, 24 Hz for the streaming content, or the like.

The one or more processor 130 may control the T-CONs of the display module 10 to operate at frame rates corresponding to the identified type of content corresponding to the region in which each of the plurality of content is displayed.

Referring to FIG. 7, the display apparatus 100 may display three different contents received from one source device 200-5.

The one or more processor 130 may control the T-CON to adjust the frame rate of the display module included in the region where the first content 1 is displayed based on at least one of the region in which the first content 1 is displayed, the type of the first content 1, or the frame rate of the first content 1.

The one or more processor 130 may control the T-CON to adjust the frame rate of the display module included in the region in which the second content 2 is displayed based on at least one of the region in which the second content 2 is displayed, the type of the second content 2, or the frame rate of the first content 2.

The one or more processor 130 may display each of the first to third content 1, 2, and 3 at the same frame rate or different frame rates.

Figure 8:
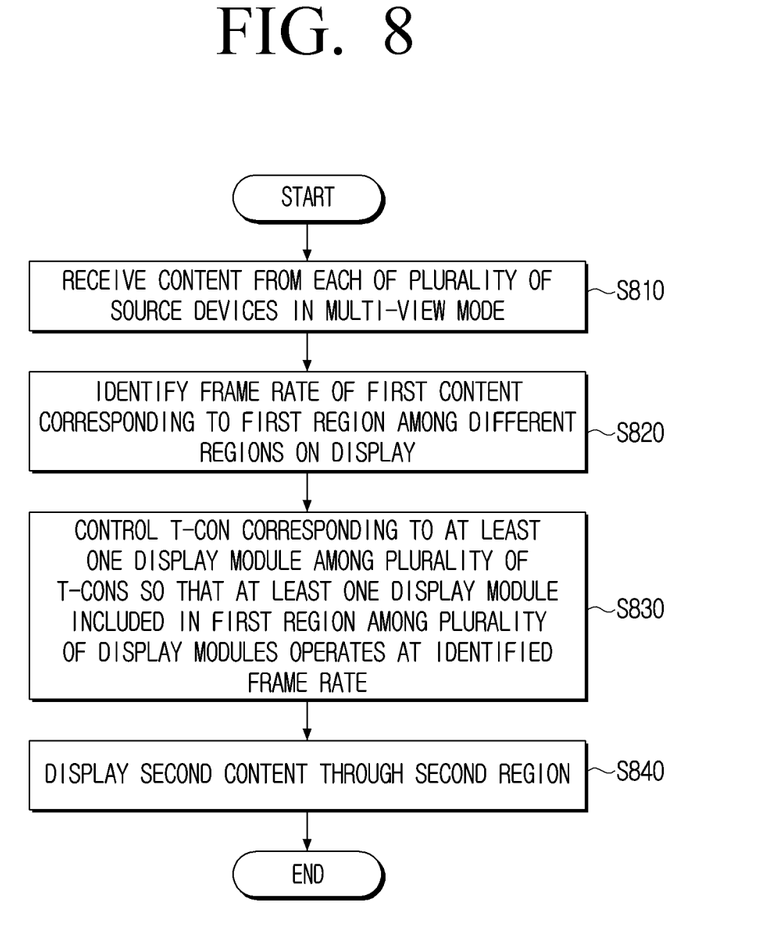
FIG. 8 is a flowchart illustrating a method of controlling a display apparatus according to an embodiment.

FIG. 8 is a flowchart illustrating a method of controlling a display apparatus according to an embodiment.

According to an embodiment, a method of controlling a display apparatus that includes a display with a plurality of display modules and a plurality of T-CONs which correspond to each of the plurality of display modules is provided. The display apparatus receives content from each of a plurality of source devices in a multi-view mode in operation 5810.

The method may include identifying a frame rate of the first content corresponding to a first region among the different regions in operation 5820.

The method may include controlling a T-CON corresponding to the at least one display module among the plurality of T-CONs so that at least one display module included in the first area among the plurality of display modules operates at the identified frame rate in operation 5830.

The content corresponding to other regions is displayed under control of T-CONs corresponding to other display modules in operation 5840.

The displaying the received content in operation 5840 may include resizing a size of the second content displayed in a second region among the different regions based on the size of the second region; controlling the T-CON so that a frame rate of at least one display module included in the second region corresponds to a frame rate of the second content; and displaying the resized second content on the second region.

The displaying the received content in operation 5840 may further include maintaining a frame rate of each of the first content displayed on the first region and the second content displayed on the second region, and the frame rate of the first content and the frame rate of the second content may be different.

The displaying the received content may include identifying the type of second content displayed in a second region among the different regions; obtaining a frame rate corresponding to the identified type; and controlling the T-CON so that display modules included in the second region operate at the obtained frame rate.

The displaying the received content may include controlling the T-CON so that at least one display module included in a second region among the different regions operates at a preset frame rate; and displaying second content in the second region.

The preset frame rate may be identical or different from the frame rate of the content.

The operation 5840 of displaying the received content according to an embodiment may include adjusting the resolution of second content displayed in a second region among different regions on the basis of the resolution of a second region; controlling the T-CON to correspond to the frame rate of the second content included in the second region; and displaying the second content in which the resolution is adjusted in the second region.

The operation 5840 of displaying the received content according to an embodiment may include: identifying a size of a second region among different regions; and controlling the timing controller to operate at least one display module included in the second region at a preset frame rate if the identified size is equal to or greater than a threshold value.

A minimum size of the different regions may correspond to the size of the display module controlled by one T-CON.

The various embodiments may be applied to various electronic devices which include a display.

The various embodiments described above may be implemented in a recordable medium which is readable by a computer or a device similar to the computer using software, hardware, or the combination of software and hardware. In some cases, embodiments described herein may be implemented by the processor itself. According to a software implementation, embodiments such as the procedures and functions described herein may be implemented with separate software modules. Each of the software modules may perform one or more of the functions and operations described herein.

Computer instructions for performing the processing operations of the display apparatus 100 according to various embodiments described above may be stored in a non-transitory computer-readable medium. The computer instructions stored in the non-transitory computer-readable medium cause a particular apparatus to perform the processing operations on a display apparatus according to the various embodiments described above when executed by a processor of a particular apparatus.

The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a CD, a DVD, a hard disk drive, a Blu-ray disc, a USB, a memory card, and a ROM.

While aspects of embodiments have been shown and described, the disclosure is not limited to the specifically described embodiments, and various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A display apparatus comprising:
a display comprising a plurality of display modules;
a timing controller (T-CON) corresponding to each of the plurality of display modules;
a communication interface comprising a circuitry; and
one or more processors configured to, based on receiving content from each of a plurality of source devices through the communication interface in a multi-view mode, control the display to display the received content through different regions on the display,
wherein the one or more processors are further configured to:
identify a first frame rate of the first content displayed in a first region among the different regions, and
control the T-CON corresponding to the at least one display module among the plurality of T-CONs to operate the at least one display module included in the first region among the plurality of display modules at the identified first frame rate.

2. The display apparatus of claim 1, wherein the one or more processors are further configured to:
resize second content displayed in a second region among the different regions based on a size of the second region,
control the T-CON corresponding to at least one display module included in the second region to operate the at least one display module included in the second region at a second frame rate of the second content, and
control the display to display the resized second content on the second region.

3. The display apparatus of claim 2, wherein the one or more processors are further configured to:
maintain the first frame rate of the first content displayed on the first region and the second frame rate of the second content displayed on the second region, and
wherein the first frame rate of the first content and the second frame rate of the second content are different.

4. The display apparatus of claim 1, wherein the one or more processors are further configured to:
identify a type of second content displayed on a second region among the different regions,
identify a frame rate corresponding to the identified type, and
control the T-CON corresponding to at least one display module included in the second region to operate the at least one display module included in the second region at the identified frame rate.

5. The display apparatus of claim 1, wherein the one or more processors are further configured to:
control the T-CON corresponding to at least one display module included in a second region among the different regions to operate the at least one display module included in the second region at a preset frame rate, and
control the display to display second content on the second region.

6. The display apparatus of claim 5, wherein the preset frame rate is identical or different from a second frame rate of the second content.

7. The display apparatus of claim 1, wherein the one or more processors are further configured to:
adjust resolution of second content displayed in a second region among the different regions based on the resolution of the second region,
control the T-CON corresponding to at least one display module included in the second region to operate the at least one display module included in the second region at a second frame rate of the second content, and
control the display to display the resolution-adjusted second content on the second region.

8. The display apparatus of claim 1, wherein the one or more processors are further configured to:
identify a size of a second region among the different regions, and
based on the identified size being greater than or equal to a threshold, control the T-CON corresponding to at least one display module included in a second region among the different regions to operate the at least one display module included in the second region at a preset frame rate.

9. The display apparatus of claim 1, wherein a minimum size of the different regions corresponds to a size of one of the plurality of display modules.

10. A method of controlling a display apparatus comprising a display comprising a plurality of display modules and a timing controller (T-CON) corresponding to each of the plurality of display modules, the method comprising:
receiving content from each of a plurality of source devices in a multi-view mode; and
displaying the received content through different regions on the display,
wherein the displaying the received content comprises:
identifying a first frame rate of the first content displayed in a first region among the different regions; and
controlling the T-CON corresponding to the at least one display module among the plurality of T-CONs to operate the at least one display module included in the first region among the plurality of display modules at the identified first frame rate.

11. The method of claim 10, wherein the displaying the received content comprises:
resizing the second content displayed in a second region among the different regions based on a size of the second region;
controlling the T-CON corresponding to at least one display module included in the second region to operate the at least one display module included in the second region at a second frame rate of the second content; and
displaying the resized second content on the second region.

12. The method of claim 11, wherein the displaying the received content further comprises:
maintaining the first frame rate of the first content displayed on the first region and the second frame rate of the second content displayed on the second region,
wherein the first frame rate of the first content and the second frame rate of the second content are different.

13. The method of claim 10, wherein the displaying the received content comprises:
identifying a type of second content displayed on a second region among the different regions;
identify a frame rate corresponding to the identified type; and
controlling the T-CON corresponding to at least one display module included in the second region to operate the at least one display module included in the second region at the identified frame rate.

14. The method of claim 10, wherein the displaying the received content comprises:
controlling the T-CON corresponding to at least one display module included in a second region among the different regions to operate the at least one display module included in the second region at a preset frame rate; and
displaying second content on the second region.

15. The method of claim 14, wherein the preset frame rate is identical or different from a second frame rate of the second content.

16. A display apparatus comprising:
a display comprising a plurality of display modules, the plurality of display modules comprising a first display module and a second display module;
a timing controller;
a communication interface; and
one or more processors configured to, based on content received from a plurality of source devices through the communication interface in a multi-view mode, control the display to display the received content through different regions on the display,
identify a first frame rate of first content received from a first source device and a second frame rate of second content received from a second source device,
control the timing controller to control the first display module to operate at the first frame rate, and
control the timing controller to control the second display module to operate at the second frame rate.

17. The display apparatus of claim 16, wherein the one or more processors are further configured to:
control display of the first content on a first region of the display and the second content on a second region of the display, the first region comprising the first display module and the second region comprising the second display module, resize the second content based on a size of the second region, and control the resized second content to be displayed on the second region.

18. The display apparatus of claim 17, wherein the one or more processors are further configured to control display of the first content on the first region at the first frame rate and display of the second content on the second region at the second frame rate, and wherein the first frame rate and the second frame rate are different.

19. The display apparatus of claim 16, wherein the one or more processors are further configured to:

identify a type of the second content, and obtain the second frame rate based on the identified type.

20. The display apparatus of claim 16, wherein the second frame rate is a preset frame rate.

\* \* \* \* \*